Dec. 24, 1935.  J. A. DICKINSON  2,025,665
VALVE
Filed June 10, 1932  2 Sheets-Sheet 1
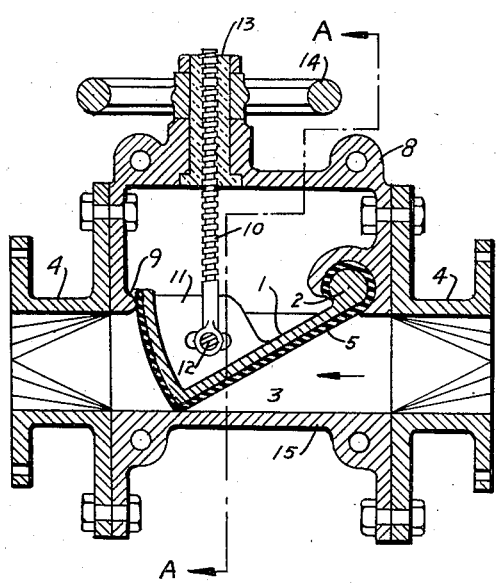
- FIG. 1. -
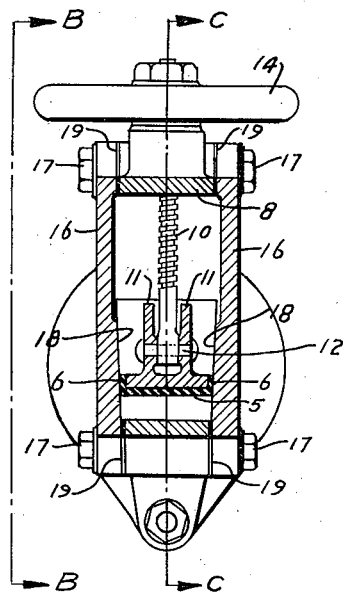
- FIG. 2. -
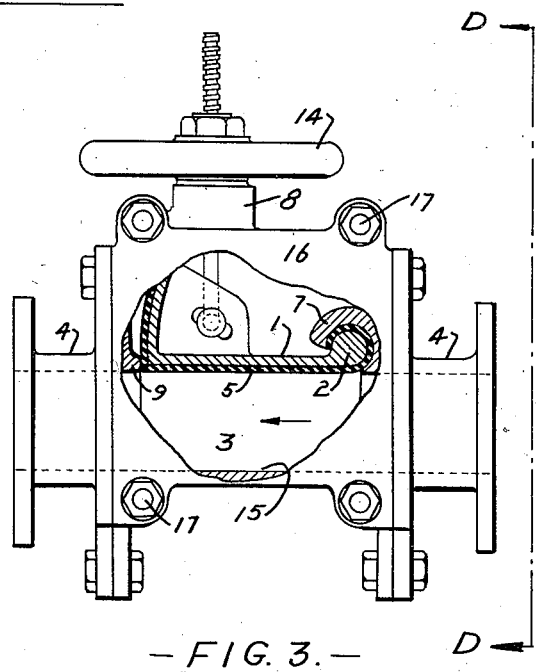
- FIG. 3. -
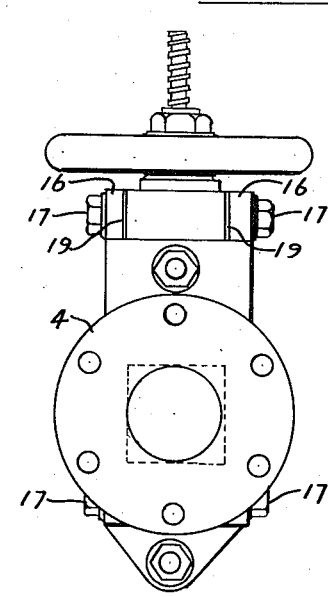
- FIG. 4. -
John A. Dickinson
Inventor Dec. 24, 1935.  J. A. DICKINSON  2,025,665
VALVE
Filed June 10, 1932   2 Sheets-Sheet 2
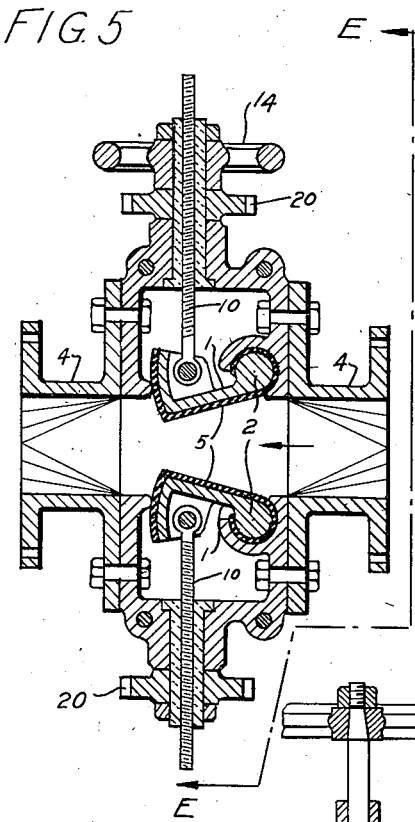
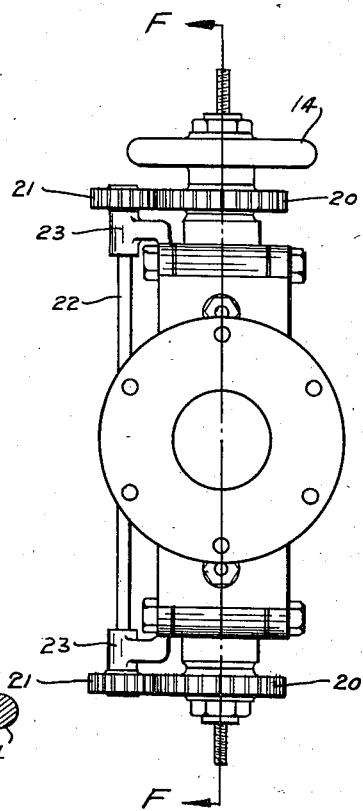
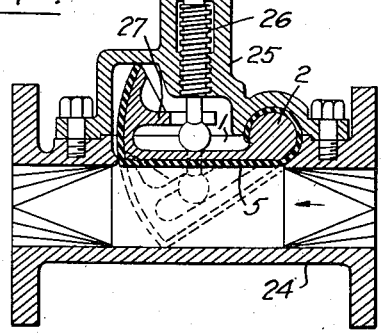
John A. Dickinson
Inventor Patented Dec. 24, 1935

2,025,665

UNITED STATES PATENT OFFICE 2,025,665

VALVE

John Arthur Dickinson, Smooth Rock Falls, Ontario, Canada

Application June 10, 1932, Serial No. 616,413

2 Claims. (Cl. 251—17)

This invention relates to improvements in valves, and more particularly to valves used to control the flow of liquids or gases through pipe lines or other means used for conducting a fluid, and has for its primary object the reduction of friction losses caused by the component parts of present types of valves, such as gates, discs, seats, stems, projections and recesses etc., thereby reducing the power required to deliver a given flow of liquid, or enable a larger quantity of liquid to be delivered for the same expenditure of power.

A further object is to provide a valve in which the parts exposed to the flow of liquid are reduced to a minimum, thereby reducing the cost of replacing such parts when worn by erosion or corrosion caused by the flow of liquid.

Another object is to provide a valve in which the tendency to plug up is reduced to a minimum, as when conveying fluids in which material is carried in suspension, such as pulp stock, etc.

In addition to the elimination of obstructions to flow as mentioned above, this invention also has for its object, to provide a valve in which the flow of liquid follows a more or less "streamline" contour, approximating the conditions of a nozzle, whereby the turbulence and eddying of the flow is reduced to a minimum, and which turbulence and eddying is sometimes detrimental when conveying, for example, certain acids, which release gases when the turbulence is excessive.

The accompanying drawings referred to herein and forming part of this specification, show typical designs of valves in accordance with my invention.

Fig. 1 shows a vertical cross section on the line C—C of Fig. 2, with a single gate in the closed position.

Fig. 2 shows a vertical cross section on the line A—A of Fig. 1.

Fig. 3 shows an elevation on the line B—B of Fig. 2, with a fragmentary sectional view of gate in the open position.

Fig. 4 shows an end elevation on line D—D of Fig. 3.

Fig. 5 shows a vertical cross section on line F—F of Fig. 6, showing a design for a valve with double gates, the gates being in a partially open position.

Fig. 6 shows an end elevation on line E—E of Fig. 5.

Fig. 7 shows a typical vertical cross section similar to Fig. 1, with single gate in open position, and with an alternative design of body and gate operating arrangement.

In all drawings like numerals of reference indicate corresponding parts in the different views.

Referring now to Figures 1 to 4 inclusive, it will be seen that a gate (1) of special shape, is caused to move radially about a fulcrum or pivot (2). The gate has a straight face on the upstream side and a radially curved face on the downstream side, the direction of flow being indicated by the arrows in Fig. 1 and Fig. 3. The gate chamber (3) is approximately rectangular in cross section to permit the gate to move freely in a vertically radial direction.

In order to fit round pipe flanges, two end members (4) are used to provide a transition section from rectangular to circular, being of rectangular cross section at the valve end and of circular cross section at the flange end, the flanges being made to conform to the dimensions of the pipe flange or other article to which the valve is to be connected.

The gate (1) is covered on both upstream and downstream faces with a resilient compressible material such as rubber (5) and the sides of the gate are also edged with the same material as at (6). It is not necessary that all or any part of the faces of the gate be covered, but where absolute tightness is required, the points of contact should be covered. The fulcrum or pivot (2) is also covered circumferentially with rubber, and fits snugly into a semi-circular seat or housing (7) formed in top casting (8). At the point of contact between the downstream face of the gate and the casting (8), a lip (9) is formed to provide a seal.

The gate is operated by means of a threaded stem (10) attached to gate at lugs (11) by pin (12). The stem is threaded through bushing (13) to which the handwheel (14) is rigidly attached. Turning the handwheel raises or lowers the gate about the fulcrum (2).

The main object of the rubber facing is to seal the gate tight and referring to the closed position of the gate as shown in Fig. 1, it will be seen that the pivot or fulcrum (2) is free to move off centre in any direction within the limits of the compressibility of the rubber covering. It will also be seen that the point of contact between the lower edge of the gate and the bottom casting (15) is downstream from the line of pressure from the stem and handwheel, producing a leverage about the lower point of the gate. Tightening up of the handwheel compresses the rubber to a tight seat at the lower edge of the gate, and the leverage about this point also compresses the rubber on the lower side of the fulcrum at a point of contact normal to the inclined face of the gate.

The holes in lugs (11) through which the pin (12) passes, are enlarged to permit of free lateral motion of the gate, which is therefore more or less "floating" on the resiliency of the rubber facing, and permits the gate to move downstream slightly due to pressure on the upstream side, making a tight contact between the downstream face and the lip (9).

Reference now to Fig. 2 will show two side plates (16) bolted together on each side of valve casing by through bolts (17) passing through top casting (8) and bottom casting (15). These side plates completely enclose the space between the top and bottom castings and form a rectangular chamber in which the valve operates. The plates are slightly bevelled or tapered over the area where the edges of the gate make contact with the side plates as shown at (18). These bevelled faces are wider apart at the upper edge of the casing than at the lower, so that as the gate is moved downwards towards its closing position, the rubber edges of the gate are compressed by the tapered section of the casing, insuring a tight contact at the side edges of the gate. Soft rubber gaskets (19) between the side plates and the top and bottom castings, permit the degree of tightness at edges of gate to be adjusted by tightening of the bolts (17).

Figures 5 and 6 show a similar method of construction to the foregoing, but designed to accommodate two gates operating in radially opposite directions, motion being imparted to the gates by threaded stems with opposite hand threads and bushings. On these bushings are mounted spur gears (20) meshing with spur pinions (21) mounted on spindle (22) and guided in brackets (23). Turning of the handwheel operates both gears through the pinions and spindle, the right and left hand threaded stems moving the gates in opposite directions an equal amount and keeping the gate opening central at all times.

Fig. 7 shows an alternative design for a single gate valve with rectangular gate chamber and transition section cast integral in one piece as shown at (24). The upper bonnet and gland (25) is also cast in one piece to accommodate the threaded spindle (26). The gate is similar to that described for Figs. 1 to 4, except that the lifting lug (27) is designed to receive the spherical ball end of spindle (26). The dotted lines show the valve in the closed position and the ball end of the spindle is sufficiently tight between the lug (27) and the back of the gate to enable the gate to be held in any position of its travel. The rectangular body of the gate chamber (24) is provided with slightly tapered sides as before, to insure tightness at edges of gate.

There are obviously many ways in which these gates may be operated and many changes can be made in the design, shape and style of valve body or casing. Those described herein are to be considered as purely typical, and any changes therein do not detract from the main principle of my invention covering the type of gate employed.

When the gate is closed or partially open, the pressure on the upstream face being greater than on the downstream face, forces the latter against the sealing lip (9), so that the greater the pressure, the tighter the sealing effect.

With the double gate type as shown in Figs. 5 and 6, when the gates are partially open, the flow of liquid is central at all positions of opening, producing a stream flow similar to a nozzle and closely approaching the conditions of a Venturi throat, except that the stream is rectangular instead of circular in area. The velocity of flow is gradually increased to the throat or gate opening, after which it is reduced to the normal velocity of the pipe line with little or no loss in head other than the increased skin friction due to the increased velocity whilst passing through the throat. The longer the radius of the curved downstream face, with a correspondingly greater distance between the fulcrums of the respective gates, the nearer will the curvature of the downstream face approximate a true Venturi nozzle for ideal conditions of flow. The upstream face may also be curved slightly if desired instead of straight as shown, but I prefer to keep this straight so as to obtain maximum area when the gates are full open.

Similar remarks to the foregoing apply to the single gate type of valve, except that the nozzle effect of the gate opening is not so pronounced, the lower side of the stream being parallel to the direction of flow, whilst the upper side follows the contour of the gate opening. It is however believed that the frictional conditions of the single gate type will be only very slightly greater, if any, than the double gate type, and that the difference will be of minor practical importance in comparison with the cheaper cost and more simple construction of the single gate type.

When the gates are fully opened it will be observed that there are no obstructions of any kind to impede or restrict the flow of liquid and no recesses to cause eddy currents or turbulence. The gradual transition from rectangular to circular cross section also permits the flow to pass through with practically no loss in head other than that produced by the skin friction of the interior of the casing, which should approximate the frictional conditions of the pipe to which the valve is connected.

The use of rubber for sealing purposes limits the use of this valve to water, liquids or gases of a temperature low enough to be withstood by the rubber, but for certain uses, lead or similar compressible material may be used, or the whole gate member may be made of some compressible material consistent with the strength required. Where absolute tightness is not required, the compressible material may be omitted, and the valve used merely for regulating or controlling the flow.

One of the most important advantages of this type of valve, apart from improved flow conditions, is the absence of any tendency to plug when used for such purposes as pulp stock or other materials carried in suspension in liquid, which have a tendency to adhere to and build up on any obstructions or in any recesses, causing the valve to plug. With this new type of valve any accumulations of solid matter on the upstream side must necessarily pass through the gates when full open, on account of the enlarged rectangular area of casing compared with the circular area of pipe line, and there are no obstructions or recesses to resist this motion, on which the accumulated material can adhere against the upstream pressure.

From the foregoing it will be apparent that the present invention provides valuable improvements in valves, whereby the objects set forth have been attained. Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:—

1. A valve comprising a casing formed with a passage therethrough of substantially rectangular cross-section, a gate mounted for movement into and out of obstructing relation with said passage, the gate being of L-shaped form and having a pivotal mounting at the extremity of its longer leg, said pivotal mounting being without the boundary of said passage, the shorter leg being of arcuate form and of an area to completely obstruct said passage when the longer leg is moved diagonally across said passage, the longer leg constituting one wall of the passage when the gate is in open position, and a covering of resilient material applied to the passage facing sides of both legs of the gate and extended on to the side edges thereof for contact with the side walls of the casing, the covering being extended into the pivotal mounting to provide for limited bodily movement of the gate in the direction of the length of the longer leg.

2. A valve comprising a casing formed with a top casting, a bottom casting spaced from the top casting, pipe coupling members bolted to the castings on opposite ends, and plates defining a passage of substantially rectangular form cross-sectionally, a gate of L-shaped form having a pivotal mounting in the upper casting and being movable into the latter so that its longer leg defines the upper wall of said passage, the shorter leg of the gate being of arcuate form and bridging the two castings when the gate is in closed position at which time the longer leg extends diagonally across said passage from the lower casting to the pivotal mounting, and manual means carried by the upper casting and operatively connected with the gate for moving the latter selectively to its open and closed positions.

JOHN ARTHUR DICKINSON.